(12) United States Patent
Das et al.

(10) Patent No.: US 7,706,571 B2
(45) Date of Patent: Apr. 27, 2010

(54) FLEXIBLE LAYER TRACKING WITH WEAK ONLINE APPEARANCE MODEL

(75) Inventors: Subhodev Das, Princeton, NJ (US); Manoj Aggarwal, Lawrenceville, NJ (US); Harpreet Singh Sawhney, West Windsor, NJ (US); Rakesh Kumar, West Windsor, NJ (US); Supun Samarasekera, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 842 days.

(21) Appl. No.: 11/250,181

(22) Filed: Oct. 13, 2005

(65) Prior Publication Data

US 2007/0086621 A1    Apr. 19, 2007

Related U.S. Application Data

(60) Provisional application No. 60/618,126, filed on Oct. 13, 2004.

(51) Int. Cl.
*G06K 9/00* (2006.01)
(52) U.S. Cl. .................................................. 382/103
(58) Field of Classification Search .................. 382/103
See application file for complete search history.

(56) References Cited

U.S. PATENT DOCUMENTS 6,591,235 B1 * 7/2003 Chen et al. .................. 704/236
6,788,809 B1 * 9/2004 Grzeszczuk et al. ......... 382/154
2003/0035592 A1 * 2/2003 Cornog et al. ............... 382/284
2003/0053659 A1  3/2003 Pavlidis et al.

OTHER PUBLICATIONS

Jepson et al., "Robust Online Appearance Models for Visual Tracking," IEEE Conference on Computer Vision and Pattern Recognition, Kauai, vol. I, pp. 415-422 (2001).
J.A. Bilmes, "A Gentle Tutorial of the EM Algorithm And Its Application To Parameter Estimation for Gaussian Mixture And Hidden Markov Models," International Computer Science Institute, Tech. Report TR-97-021 (1998).
A.P. Dempster, et al., "Maximum Likelihood From Incomplete Data Via The EM Algorithm," Harvard University and Educational Testing Service, J. Royal Statistical Society B, No. 39, pp. 1-38 (Dec. 8, 1976).

* cited by examiner

*Primary Examiner*—Bhavesh M Mehta
*Assistant Examiner*—Hadi Akhavannik
(74) *Attorney, Agent, or Firm*—Lowenstein Sandler PC

(57) ABSTRACT

Method for tracking an object recorded within a selected frame of a sequence of frames of video data, using a plurality of layers, where at least one object layer of the plurality of layers represents the object includes initializing layer ownership probabilities for pixels of the selected frame using a non-parametric motion model, estimating a set of motion parameters of the plurality of layers for the selected frame using a parametric maximization algorithm and tracking the object. The non-parametric motion model is optical flow and includes warping the mixing probabilities, the appearances of the plurality of layers, and the observed pixel data from the pixels of the preceding frame to the pixels of the selected frame to initialize the layer ownership probabilities for the pixels of the selected frame.

7 Claims, 13 Drawing Sheets

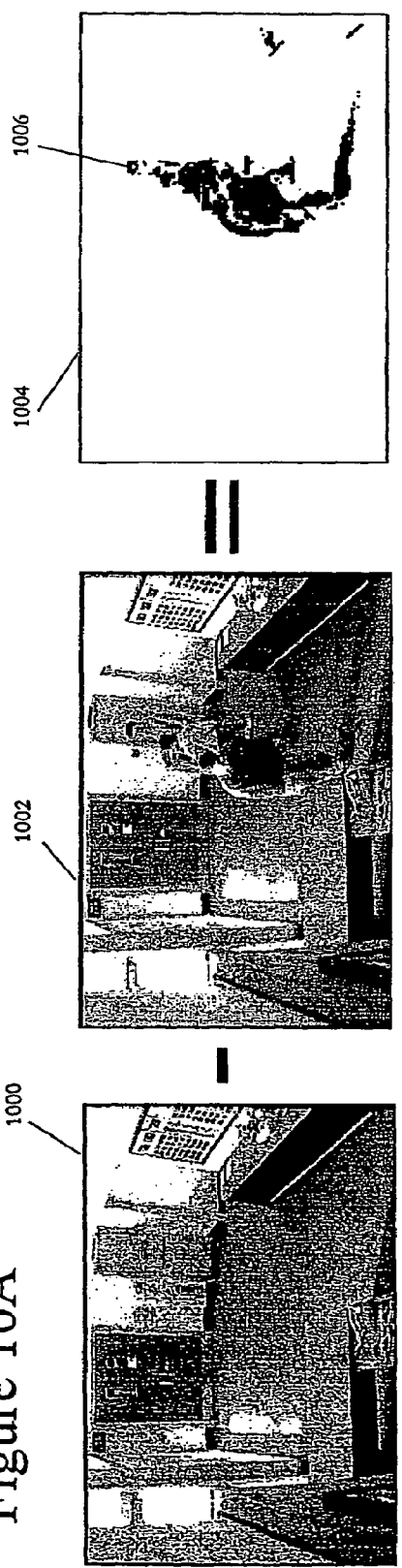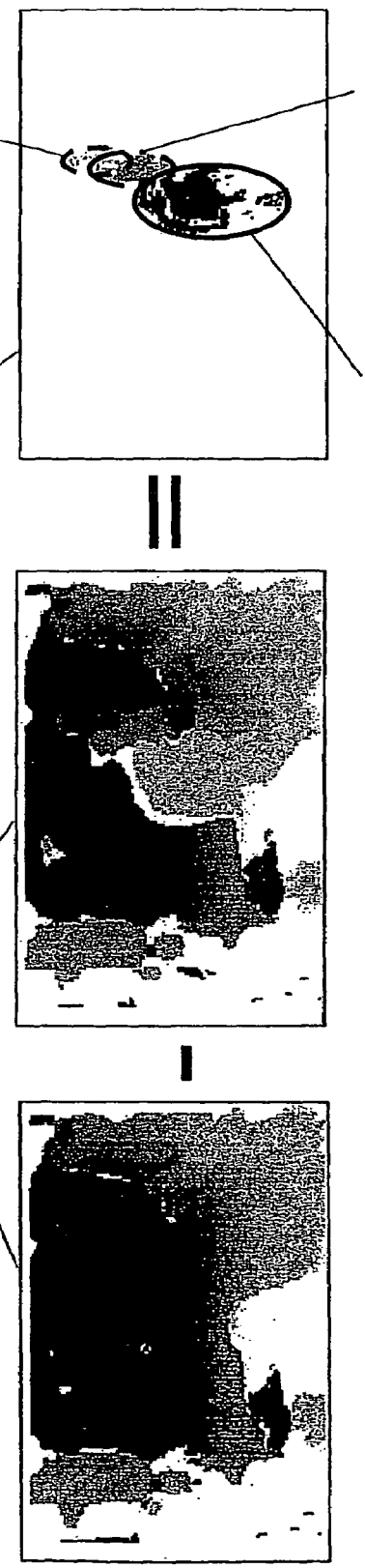
Figure 10A
Figure 10B

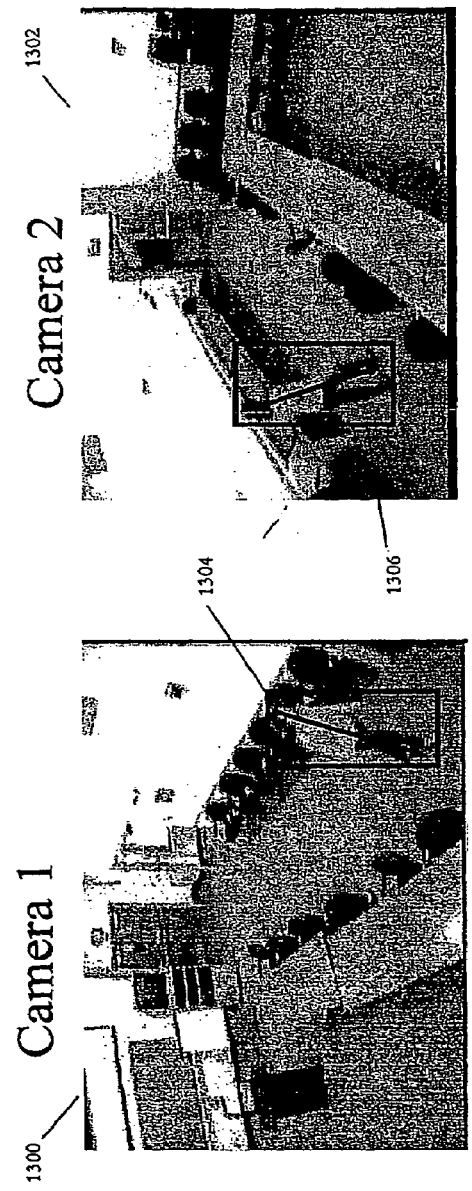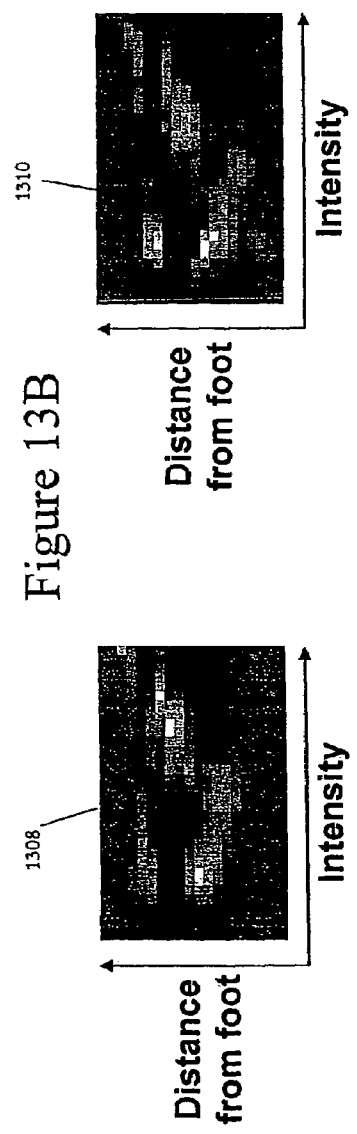
Figure 13A
Figure 13B ered. Not yet supported is tracking and drift and/or tracking loss.

FLEXIBLE LAYER TRACKING WITH WEAK ONLINE APPEARANCE MODEL

CROSS-REFERENCE TO RELATED APPLICATIONS

This application claims benefit of U.S. provisional patent application Ser. No. 60/618,126, filed Oct. 13, 2004, which is herein incorporated by reference.

GOVERNMENT RIGHTS IN THIS INVENTION

This invention was made with U.S. government support under contract number F30602-00-C-0143. The U.S. government has certain rights in this invention.

BACKGROUND OF THE INVENTION

1. Field of the Invention

The present invention is related to the field of video processing and more particularly concerns a layer-based tracking method for tracking objects within and across video images. This method may also allow improved instantiation of objects and tracking through occlusions.

2. Description of the Related Art

Video representations in terms of dynamic layers and associated algorithms have emerged as powerful tools for motion analysis and object tracking. In this form, the image is represented as a superposition of multiple independently moving regions, also referred to as layers. The decomposition into layers provides a natural way to estimate motion of independently moving objects. For object tracking applications, a layer is represented by three entities: appearance; shape; and motion models. Since, a priori, the decomposition of image/video into layers is unknown, layer-based tracking algorithms jointly estimate the layer decomposition, appearance, shape, and motion over time.

Layer-based methods use parametric motion models to match the appearance and shape model parameters of the existing layers to the new observation of a new frame, and thereby update the motion, appearance and shape models. The underlying assumption of such a procedure is that the layer is rigid (up to a parametric transformation, such as affine). Thus, these methods are unable to handle complex non-rigid motions of layers, unless these motions are explicitly modeled by using separate layers for each of the articulations of an object.

A key problem in layer-based trackers is that of estimating the motion parameters for the layers given their appearance and shape representations. Some existing layer-based methods, use an iterative Expectation Maximization (EM) algorithm to estimate the motion parameters. In the Expectation step (E), a parametric motion estimate is used to warp the appearance and shape models from time t−1 to the current time t. These parametrically warped appearance and shape models are then matched with the new observations to compute the layer ownerships. In the Maximization (M) step, these computed ownerships are used to refine the motion estimates. It should be noted that parametric motion constraints are used to estimate the layer ownerships. With such an E step it is desirable for either the object motion to strictly conform to the parametric motion model employed, or for the object motion to vary slowly enough from the parametric motion model that the resulting ownership estimates remain a sufficiently accurate approximation to allow correct assignment of pixels among various layers. Even if the object motion is rigid, estimating ownerships in this manner uses a pixel-by-pixel match between the parametrically warped appearance models and the observations. In such a match it is desirable for the selected appearance model to be capable of accounting for rapid within-object shade or texture variations. An example of such potential appearance variation occurs when a car that is being tracked moves through the shadow of a leafless tree. The texture of shadow on the car appears to move in the opposite direction to that of the car. Both non-rigid motion and rapid intra-object appearance variations can lead to a poor approximation for ownership estimates, which may cause the EM algorithm to undesirably lock on to local maxima and may result in tracking drift and/or tracking loss.

Some template trackers use parametric motion (affine/similarity etc.) to update both the motion and the shape of the template. However, drift may still occur in these models because there is no explicit updating of template ownership. The appearance model can also be chosen to be the previous frame, but is susceptible to drift near occlusions, Some methods use global statistics such as color histograms, instead of templates. Because these methods do not enforce pixel-wise appearance, they are robust to rapid shape and appearance changes. However, histograms are relatively weak appearance representations. Therefore, the tracking of objects can drift near occlusions or when nearby regions have similar statistics to the object being tracked.

The motion model used within each layer is often modeled as a single two dimensional affine model. Such methods may model rigid objects reasonably well, but often have difficulties with non-rigid objects. For non-rigid objects, such as people, proposals include a further decomposition of a tracked non-rigid object into multiple layers (arms, legs and torso) to account for the independently moving body parts. However, the complexity of the problem increases linearly with the number of layers.

As none of these approaches fully address the problems of providing an accurate tracking system that remains robust even in cases such as partial or complete occlusion, including objects passing one another, and the tracking of non-rigid objects, there is a need for a method and video processing techniques for same. Additionally, difficulties remain in the instantiation of layers, particularly dealing with issues such as shadow removal and distinguishing overlapping objects. Another area in which improvement is desirable is the tracking of objects between multiple cameras, including the identification of objects in multiple simultaneous images taken from differing viewpoints.

SUMMARY OF THE INVENTION

The disadvantages associated with the prior art are overcome by a method for tracking an object recorded within a selected frame of a sequence of frames of video data, using a plurality of layers, where at least one object layer of the plurality of layers represents the object. The specific steps of the method include a) initializing layer ownership probabilities for pixels of the selected frame using a non-parametric motion model, b) estimating a set of motion parameters of the plurality of layers for the selected frame using a parametric maximization algorithm and c) tracking the object. The estimating of step (b) is based on appearances of the plurality of layers for a proceeding frame of the sequence of frames, mixing probabilities and observed pixel data from pixels of the preceding frame, observed pixel data and the layer ownership probabilities for the pixels of the selected frame and an initial estimated set of motion parameters of the plurality of layers for the selected frame. The tracking of step (c) is based on the layer ownership probabilities for the pixels of the selected frame and the set of motion parameters of the at least one object layer estimated in step (b).

In one embodiment of the invention, the non-parametric motion model used in step (a) is optical flow and step (a) includes warping the mixing probabilities, the appearances of the plurality of layers, and the observed pixel data from the pixels of the preceding frame to the pixels of the selected frame to initialize the layer ownership probabilities for the pixels of the selected frame. In a second embodiment of the invention, the non-parametric motion model used in step (a) includes matching of two dimensional histograms of the appearances of the plurality of layers of the preceding frame and the observed pixel data of blobs of pixels of the selected frame. In a third embodiment of the invention, the non-parametric motion model used in step (a) includes matching of three dimensional histograms of appearances of the plurality of layers of the preceding frame and the observed pixel data of blobs of pixels of the selected frame. In a fourth embodiment of the invention, the non-parametric motion model used in step (a) includes a geometry-based constraint on the layer ownership probabilities.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 10A is a block diagram illustrating an exemplary method of using appearance constraints to identify layers.

FIG. 10B is a block diagram illustrating an exemplary method of using three dimensional depth constraints to identify layers according to the present invention.

FIG. 13A is a pair of video frames from different cameras illustrating two simultaneous views of a single person.

FIG. 13B is a pair of three dimensional histograms of the person in the frames of FIG. 13A that may be used in the exemplary method of FIG. 11.

DETAILED DESCRIPTION

Figure 1:
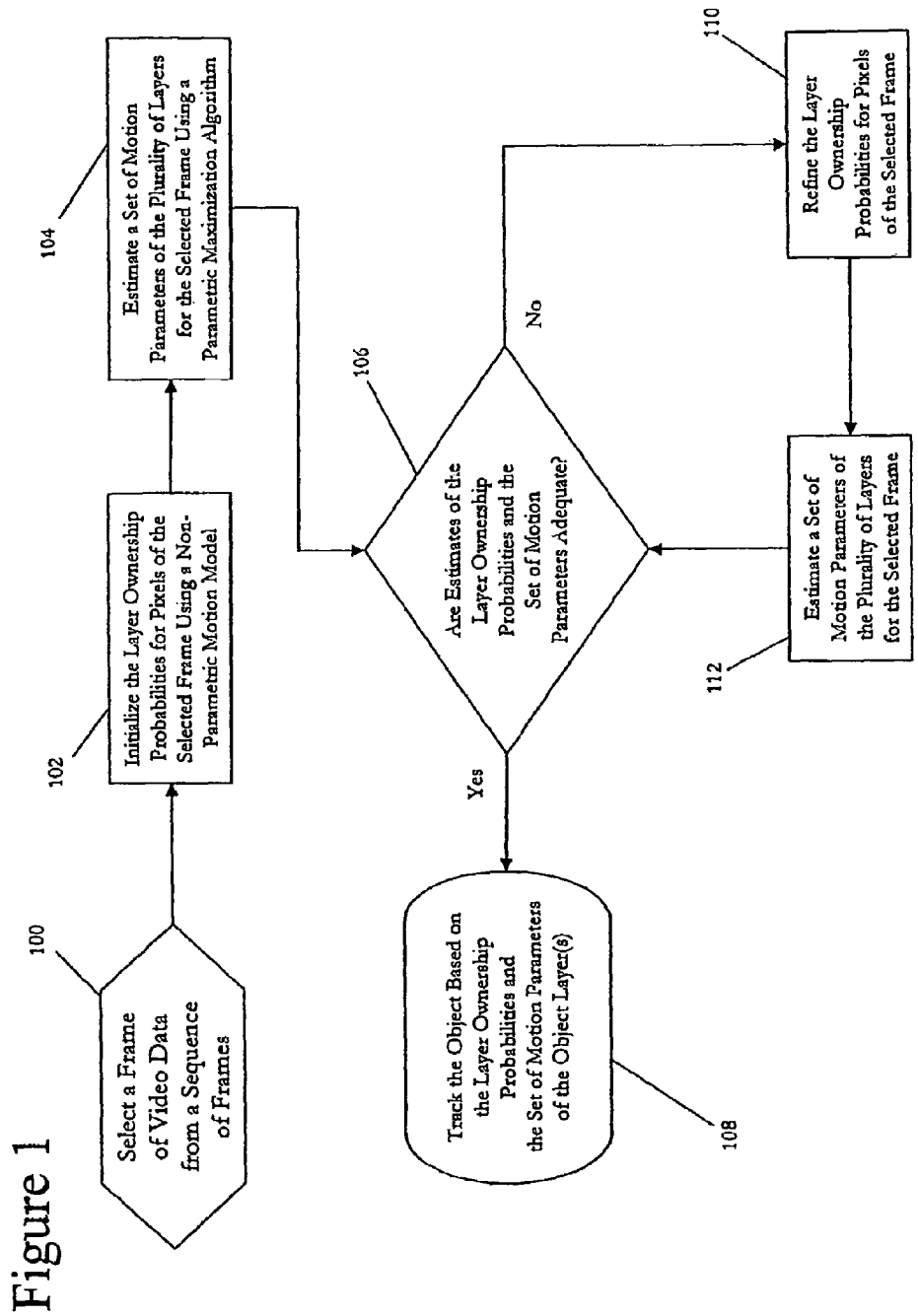
FIG. 1 is a flow chart illustrating an exemplary method of tracking an object in a sequence of video data according to the present invention.

The present invention includes exemplary methods for tracking within a layer-tracking framework for a variety of different objects, both rigid and non-rigid, with potentially significant frame-to-frame appearance changes, but without the need for using complex models of (articulated) motion and shape. These exemplary methods make use of both non-parametric and parametric motion models to achieve robust tracking of multiple non-rigid objects with rapidly changing appearances. Selective use of non-parametric motion models, such as optical flow that may be estimated using strong appearance constraints, accounts for non-rigidity in layer motion. These non-parametric motion models are then used in conjunction with simplified parametric motion models, with weak appearance constraints, to enforce object coherence.

The exemplary overall observation model for an observed pixel $d_t$ may be given as a weighted sum of the appearance model distributions for each of the objects, the background, and an outlier process to accommodate spurious pixel intensity changes. The weights used in summing various distributions are also known as mixing proportions or mixing probabilities. This exemplary formulation is general enough to handle multiple objects. The objective is to jointly estimate all parameters, $\Lambda_t = \{M_t, \Psi_t, \Theta_t\}$, to maximize the observation likelihood, where $M_t$ is the set of mixing probabilities for all layers at time t, $\Psi_t$ is the set of all learned appearance models of all object layers at time t, and $\Theta_t$ is the set of all motion parameters for all object layers at time t. An Expectation-Maximization (EM) algorithm may be used to solve this joint estimation problem.

In particular, a Laplacian filtered representation of the image may be used to represent the observation data, $d_t$. A Laplacian representation may be desirable as it provides some degree of invariance to illumination changes, thereby adding natural degree stability to the object appearance.

The background model in this exemplary method is modeled as an adaptive non-parametric distribution on a per pixel basis that includes a static background distribution and an outlier distribution. The background distribution may be obtained by normalizing the temporal, exponentially weighted histogram of the entire observation history. The weight at time t for the histogram bin corresponding to the pixel in a preceding frame, k, is given by $S_t(k; \tau_b) = \alpha_b e^{-(t-k)/\tau_b}$ for $k \leq t$. The time constant $\tau_b$ controls the forgetting factor, and $\alpha_b$ is the normalization constant to guarantee the sum of the weights equal 1. This exponential weighting may also lend itself to an efficient recursive update of the background distribution. This exemplary background model may also be used for object instantiation.

The outlier distribution is chosen to be uniform and accounts for data that may not be explained by any of the object/background layers. This exemplary background model may also be used for object instantiation.

In general, performing a joint estimation of all the parameters, $\{\Lambda_k\}_{k=0}^{t}$, to maximize the entire observation history, $D_t = \{d_k\}_{k=0}^{t}$, is a difficult computational problem. In one exemplary embodiment, to make the calculation tractable in real time, or near real time, the problem may be desirably split into two parts. In the first part, it may be assumed that all motion parameters, $\{\Theta_k\}_{k=0}^{t}$, are known, and an EM algorithm may be used to jointly estimate the mixture distribution parameters, $\{M_k, \Psi_k\}_{k=0}^{t}$. Jepson et al. demonstrated an exemplary solution to this step in *Robust Online Appearance Models for Visual Tracking*. In the second step, given the appearance, shape, and motion parameters, $\Lambda_{t-1}$, for time t−1, the current motion parameters, $\Theta_t$, may be estimated.

The present invention relates to novel object appearance models and robust approaches for the second EM step of estimating the current motion parameters, $\Theta_t$, given the appearance, and motion parameters, $\Lambda_{t-1}$, for time t−1. A key step in estimating the motion of an object is determining what portion of the object is visible (object ownership probabilities). On the other hand, object ownership probabilities can be reliably determined only when the motion of all objects is known. This chicken-and-egg problem of estimating object ownership and motion estimation may require a second EM algorithm to iteratively refine both object visibility and object motion. The initialization of the iterative algorithm is a key critical step to ensure the algorithm converges to the correct motion parameters.

One approach to this initialization is to initialize the set of all motion parameters for the selected frame (i.e. time t), $\Theta_t^0$, by assuming either constant velocity or constant acceleration motion individually for each object, and calculating $\Theta_t^0$ based on this prediction using a parametric motion model. This approach may be reasonable if the parametric motion model used reliably captures the true motion of the object, or if the object's shape deviates slowly enough that the parametric motion model remains a good approximation. However, for a variety of commonly tracked object types, such as human forms, faces, vehicles, animals, etc. the initial layer ownership probabilities obtained in this manner are far enough away from the correct parameters that the EM algorithm may become locked on to an undesirable local minima, resulting in the eventual loss of tracking. These problems may also lead to tracking failures in a multitude of common indoor and outdoor scenarios, such as the movement of an object through variable shadows.

Instead of predicting the desired parametric motion of each of the layers, the exemplary method of FIG. 1 uses an intermediate pixel-level non-parametric motion model to create an initial estimate of layer ownership probabilities for time t, step 102. This represents a modification of the expectation step used in many layer-based trackers. This approach circumvents the problem of getting an initial estimate of $\Theta_t^0$, by directly initializing the layer ownership probabilities, rather than estimating $\Theta_t^0$ and then computing the expected ownership probabilities. Thus, the layer ownership probabilities for pixels of the selected frame are initialized using a non-parametric motion model.

Optical flow is one exemplary non-parametric motion model that may desirably model non-rigid object motions and intra-object appearance variations. A non-parametric motion model, such as optical flow between the selected frame (time t) and a proceeding frame (time t−1) may be used to estimate the initial layer ownership probabilities directly. Such a model uses strong appearance (brightness constancy) constraints, but at the same time does not enforce a parametric match between appearance models from time t−1 and observations at time t. For the purpose of estimating layer ownership probabilities, the accuracy of flow is used only to the extent that it matches a point within the object from one frame to another point within the object within the other frame. Further, optical flow may allow a reasonable estimate of layer ownership probabilities to be obtained without explicitly modeling the various articulations. Therefore, this exemplary approach may be more general and applicable to a larger variety of objects that parametric motion models.

This exemplary approach improves the reliability of layer ownership predictions in new frames of video data, even when the motions of objects being tracked are not well modeled as parametric motions. In an exemplary maximization step, the estimated layer ownership probabilities, with weaker appearance matching constraints, are used to update the parametric motion model. Since a strong appearance matching constraint and a parametric motion constraint are not simultaneously enforced in this exemplary method, significant frame-to-frame variation in appearance and object motion may be handled without significant drift.

Figure 2A:
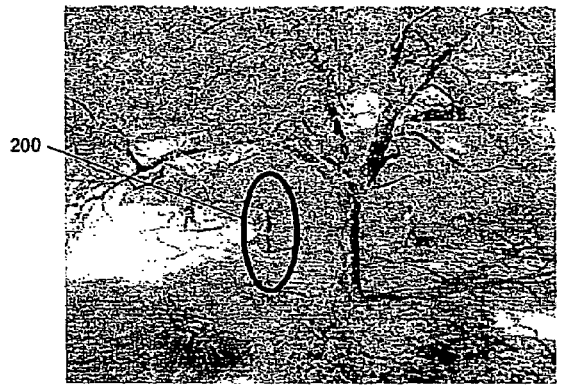
FIG. 2A is a sequence of frames of video data.
Figure 2A:
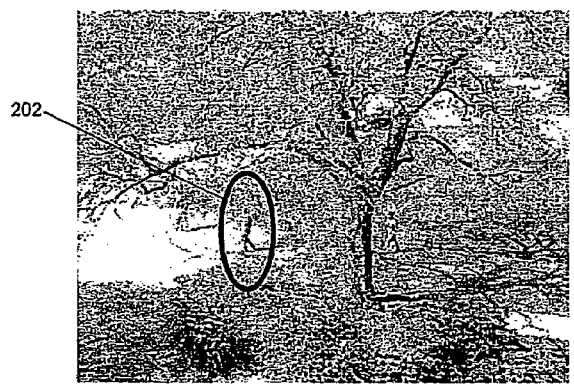
Figure 2A:
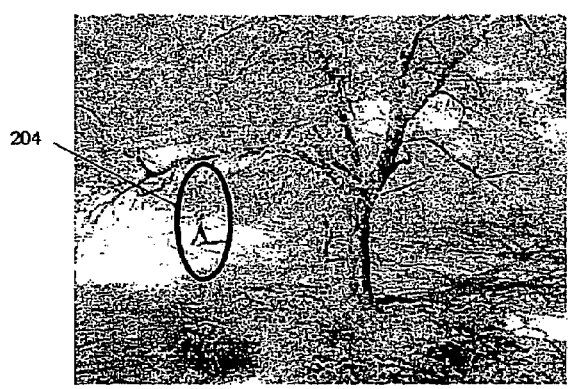
Figure 2B:
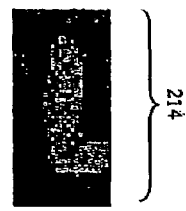
FIG. 2B illustrates exemplary templates demonstrating exemplary tracking of a person in the sequence of frames of video data of FIG. 2A using the exemplary method of FIG. 1.
Figure 2B:
Figure 2B:

FIG. 1 illustrates such an exemplary method for tracking an object recorded within a selected frame of a sequence of frames of video data. This exemplary method uses a plurality of layers, which include an object layer that represents the object to be tracked. FIGS. 2A and 2B illustrate the operation of this exemplary flexible-layer object tracker. The exemplary method of FIG. 1 is used to determine the parameters of these layers.

FIG. 2A includes three video frames taken at different times. Ovals 200, 202, and 204 in these frames show the person being tracked in these three frames. The thumbnails in FIG. 2B include a set 210 of ownership probabilities 214 demonstrating the operation of the exemplary tracker in tracking this person. This set 210 of ownership probabilities 214 represent the tracked person from frame-to-frame. Note that the tracked person stays centered within the bounding box of the templates in this exemplary tracker, demonstrating the resistance to drift of this exemplary tracker.

The exemplary tracker constantly keeps the object centered because the use of optical flow for prediction of layer ownership probabilities allows correct labeling of object pixels even when the object motions are flexible and articulated, as in the example shown in FIGS. 2A and 2B. This may be contrasted with traditional layer-based tracker the uses only parametric motion models in which these shapes tend to become fuzzy and ambiguous as the frames progress, particularly for non-rigid motions.

FIG. 1 focuses on the exemplary estimation of the layers that is performed for each frame of video data within an exemplary flexible-layer object tracking, such as is shown in FIGS. 2A and 2B. A frame of the video is selected from the sequence of frames provided by a video camera, step 100. Object tracking is often desirably performed in real time and, thus, this selection is typically performed sequentially through the sequence of frames as the frames are transmitted to the tracker from the video camera. Alternatively, other selection orders may be desirable in offline tracking implementations.

Figure 4A:
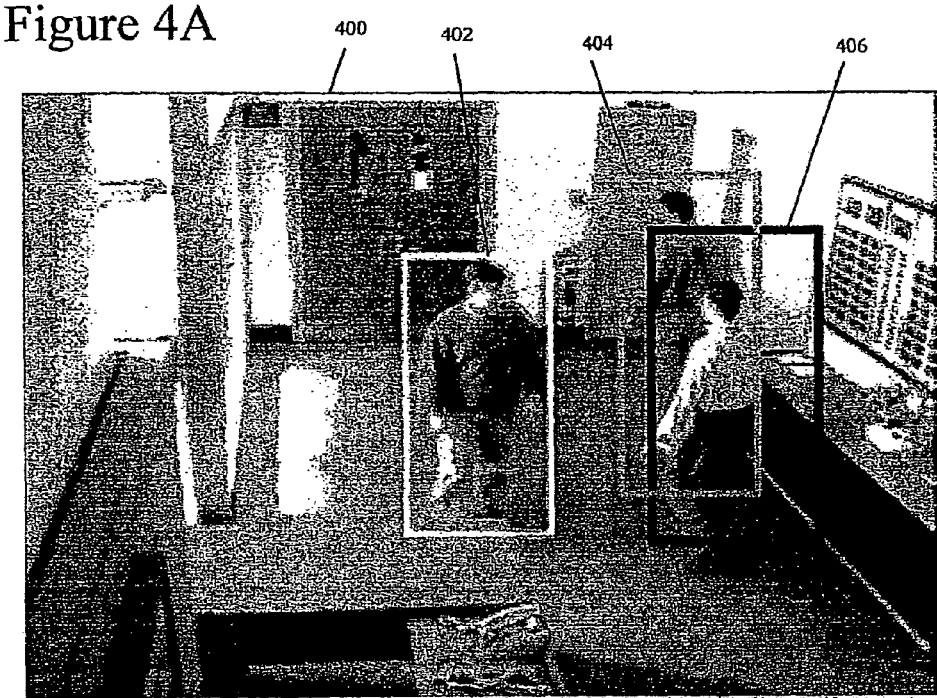
FIG. 4A is a frame of video data.
Figure 4B:
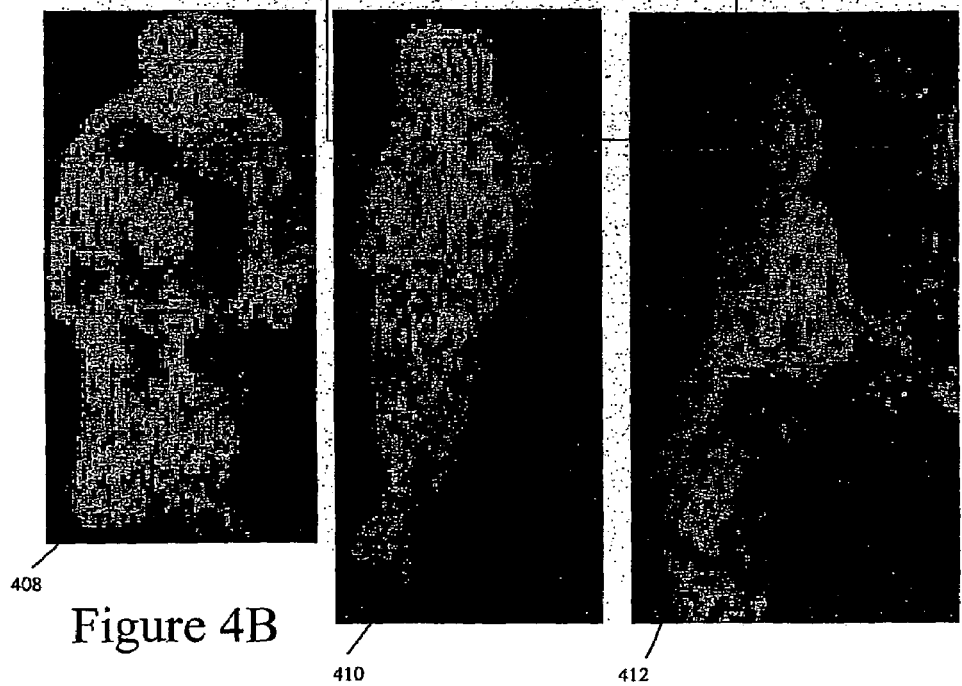
FIG. 4B illustrates exemplary templates demonstrating exemplary layer ownership probabilities of tracked people in the frame of video data of FIG. 4A.

FIGS. 4A and 4B illustrate the estimation of layer ownership probabilities in the case of a partial occlusion using the exemplary method of FIG. 1. Frame 400 in FIG. 4A includes images of three people, bounded by boxes 402, 404, and 406, that are being tracked using this exemplary method. FIG. 4B illustrates templates 408, 410, and 412, which correspond to the people in boxes 402, 404, and 406, respectively, of FIG. 4A. The brightness pixels in the templates of FIG. 4B reflect the ownership probability of the object layer representing the corresponding person. Note the area in both template 410 and template 412 corresponding to the occlusion of the person in box 404 by the person in box 406. The intensity of the pixels in this region of both templates is less bright, indicating less certainty of ownership in this region. Still, the locations of both the person in box 404 and the person in box 406 are accurately tracked as indicated by the centering of these persons in the bounding boxes. A parametric motion model may have difficulty obtaining initial ownership probabilities in this section due to the occlusion, increasing the potential for locking onto an undesirable local minimum during the occlusion, which may lead to a loss of tracking.

Another exemplary type of geometry-based shape constraint that may be included in the initialization and refinement of the ownership probabilities in steps 102 and 110. The location of the ground plane in frames of video data recorded by a stationary may be determined in advance based on the viewpoint of the camera and the fixed geometry of the scene. Based on this knowledge, the expected relationship of two or more points on a tracked object moving along the ground may be related in each frame by a simple matrix relation. For example the head and toe of a person walking through a scene may be related by Equation 1.

$$\begin{bmatrix} T_X \\ T_Y \\ 1 \end{bmatrix} = [K] \begin{bmatrix} H_X \\ H_Y \\ 1 \end{bmatrix} \quad (1)$$

Figure 6:
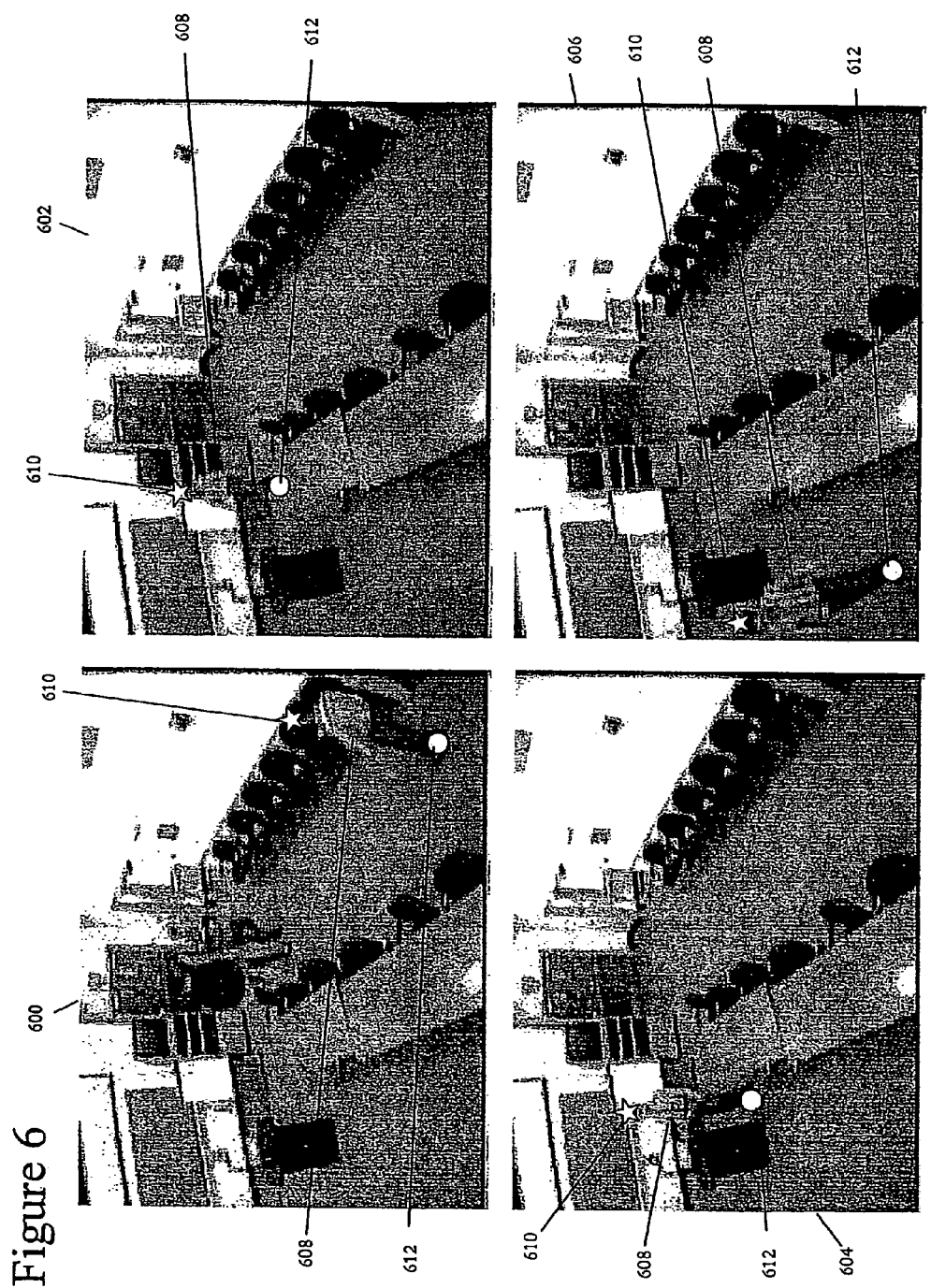
FIG. 6 is a frame of video data illustrating an exemplary ground plane geometry constraint according to the present invention.

In Equation 1, $T_{X,Y}$ are the X and Y coordinates of a toe point of a tracked person walking through a scene, $H_{X,Y}$ are the X and Y coordinates of the corresponding head point of the tracked person, and K is the transformation matrix based on the ground plane constraints. An exemplary application of this constraint is illustrated in FIG. 6. FIG. 6 includes four frames of video data 600, 602, 604, and 606. In each these frames, person 608 is being tracked. Stars 610 mark the head point of tracked person 608 and circles 612 mark his toe point in each frame. Note that in frame 602 the toe point 612 of tracked person 608 is occluded. Enforcing ground plane constraints in such situations may help to constrain an object's extent and thus ownerships during partial occlusions or inter-object occlusions. Also the ground plane constraints may be used to help determine three dimensional depth information, assist in separating tracked objects as they pass and partially occlude one another in one or more frames of a sequence, and/or assist with additional image analysis, such as shadow removal. The use of ground plane geometry constraint may prove particularly valuable during the instantiation of new layers and in the identification of tracked objects across multiple cameras, as described below.

Further exemplary types of geometry-based constraints that may be included in steps 102 and 110 include shape models for specific objects of interest. Images may be analyzed for blobs or other features that match predetermined shape models, such as the outline, or partial outline, of a type of object that the exemplary tracker is particularly attuned to tracking, i.e. the shape of a car or other vehicle or a human. These blobs or features may be formed by a number methods including: optical flow or other motion detection methods; edge detection; and spatial or spectral filtering of pixel data.

Figure 7:
FIG. 7 is a frame of video data illustrating an exemplary shape model constraint according to the present invention.

FIG. 7 illustrates the use of head and shoulder shape model 702 for identifying a person in a frame. In FIG. 7, head and shoulder shape model 702 is compared to features in edge image 700. This edge image has been formed by using an edge detection algorithm on a frame of video data.

This exemplary method may allow improved tracking selectivity and may also improve tracking when a tracked object ceases moving within the frames of video data. The use of such shape models may be particularly advantageous in video data which includes a large amount of motion of which only a relatively small amount results from objects that it is desirable to track. Shape models may be combined with other constraints, such as ground plane geometry constraints, to improve initialization of layer ownership probabilities. For example, ground plane constraints may be used to scale and orient the shape model in different portions of the selected frame.

In step 104, with the layer ownership probabilities initialized for pixels of the selected frame, a parametric motion model is estimated by matching both the appearance and shape models from the preceding frame (time t−1) with the new observations and initialized layer ownership probabilities. This step provides the necessary initialization for the EM algorithm to iteratively refine the layer ownerships and estimate the overall layer motion parameters. This iterative joint estimation algorithm may desirably be based on: the learned appearances of the layers from preceding frames of the sequence of frames; the learned mixing probabilities for pixels in the layers; the observed pixel data from pixels of the preceding frame; observed pixel data and the initialized layer ownership probabilities for the pixels of the selected frame; and an initial estimated set of motion parameters of the plurality of layers for the selected frame.

The use of a parametric motion estimation algorithm in step 104 desirably enforces object coherence, thus, avoiding drift of object pixels that may be associated with a non-parametric motion model, such as that used in step 102 to initialize the layer ownership probabilities. For general non-rigid object motion, however, it has been found that appearance matching based on parametric motion alone may not be robust. On the other hand, matching the shape model from time t−1 with the initialized layer ownership probabilities of step 104 is more forgiving, as the maximization step only tries to maximize the overlap area. Based by these observations, only weak constraints for matching appearance are employed for the purpose of estimating the parametric motion. Because a strong appearance matching constraint (in the expectation step) and a parametric motion constraint (in the maximization step) are not simultaneously enforced, significant frame-to-frame variation in appearance and object motion may be handled without drift.

An object appearance model may be simple 2D color histogram of pixels weighted over time and over the spatial extent of the layer as defined by the layer ownerships. The use of such weaker appearance models provide less stringent appearance matching constraints than other appearance template models especially when using a parametric motion model to fit non-rigid motion. This may improve the accuracy of the tracking for non-rigid objects and may also increase the robustness of the tracking algorithm to full and/or partial occlusions, particularly for occlusions involving crossings of objects that are being tracked.

Figures 5A, 5B, 5C:
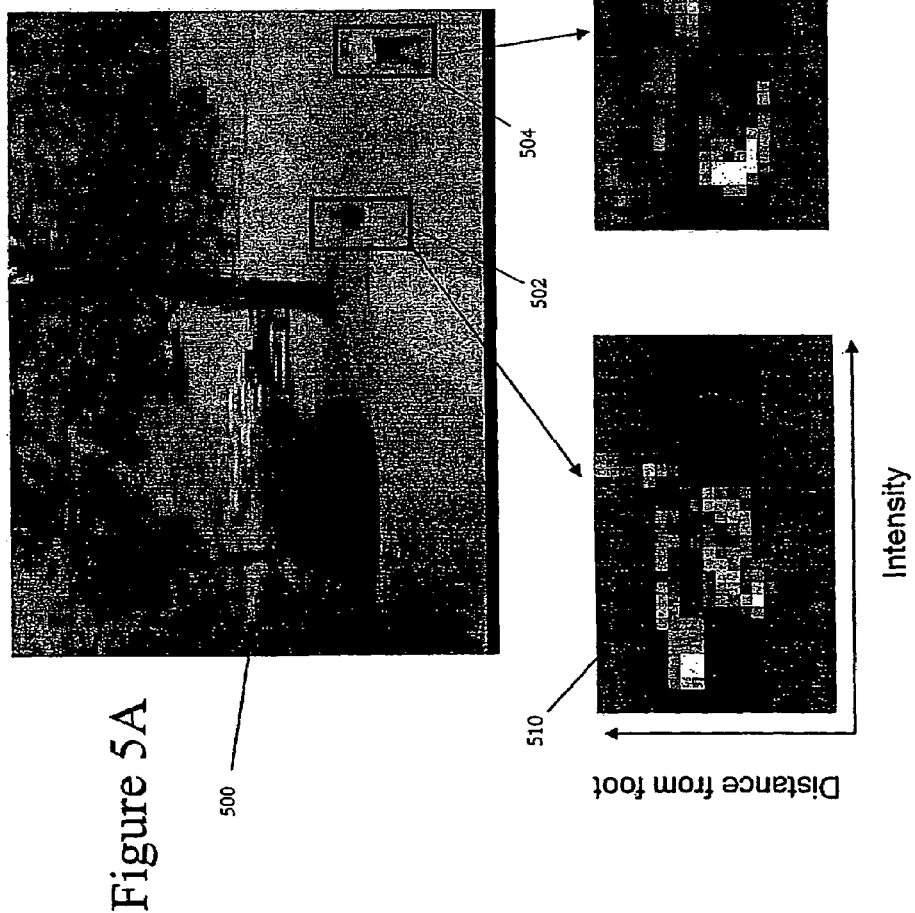
FIG. 5A is a frame of video data.
FIG. 5B is an exemplary template demonstrating an exemplary method of binning data to construct a three dimensional matching histogram according to the present invention.
FIG. 5C illustrates exemplary three dimensional matching histograms of two people being tracked in the frame of video data of FIG. 5A.

Alternatively, the histograms may be three dimensional histograms in which the bins are populated according to pixel data and a geometric constraint. FIGS. 5A-C illustrate such exemplary three dimensional histograms. FIG. 5A shows frame 500 of video data, which includes two people 502 and 504 that are being tracked in an outdoor scene. FIG. 5B illustrates template 506. This template is split into a series of bins that may be used to place data into an exemplary three dimensional histogram by lines 508. These bins represent the distance of a pixel from an edge of the blob within the template. In the example of template 506, the bins created by lines 508 represent the distance a pixel is from the person's foot. In an alternative exemplary approach, the geometric constraint used to populate the bins may be the distance of a pixel from an origin point, in which case the bins in the figure would be separated by circles, rather than straight lines as in FIG. 5B.

FIG. 5C includes two exemplary three dimensional histograms, histogram 510, which includes data from tracked person 502, and histogram 512, which includes data from tracked person 504. The bins of these exemplary three dimensional histograms are populated according to pixel intensity (X-axis) and the distance from the foot of the tracked person (Y-axis), similar to the example of FIG. 5B. The brightness of each bin corresponds to the number of pixels that are included in each bin (i.e., the Z-axis of the histogram). The two exemplary histograms in FIG. 5C illustrate an advantage of using three dimensional histograms of this type over using two dimensional histograms based only on pixel data. Two dimensional histograms based on the pixel intensity of tracked persons 502 and 504 may be very similar and, thus, difficult to distinguish, but, as shown in FIG. 5C exemplary three dimensional histograms 510 and 512 are significantly different and easily distinguishable. This is due to the fact that person 502 is wearing a dark top and light colored pant, while person 504 has on a light colored top and dark pants. It is noted that the difference in scale of the two people may be compensated by scaling the histograms based on the size of the blob in the image or the depth of the object, if depth information is available to improve tracking accuracy as objects move through the imaged space.

In experiments under a variety of situations, it has been observed that a translation motion model generally provides a robust parametric maximization algorithm and provides significant computational efficiency as well. Higher order models such as similarity, and affine motion models may tend to cause drift because of larger degrees of freedom and significant frame-to-frame variation in shape.

It is noted that translational motion models typically do not account for any scale change or affine distortions. A relatively simple set of deterministic methods may desirably be used to overcome this disadvantage. The scale and orientation can be adjusted based on the ground plane constraint. Given the head location of the person, Equation (1) provides the location of the foot. The head and foot location can then be used to determine the size and orientation of the object in the image. Further periodically, for every object being tracked, the tracker measures how much of each change blob is owned by the object. If: 1) the object owns a significant portion of a blob; 2) the sum of layer ownerships is close to blob size; and 3) there is only one such blob, then the object is reset. During this re-instantiation of the object, the bounding box, the appearance models and initial mixing probabilities are reset for that object based on the change blob. The new bounding box is reset to cover the whole change blob. This heuristic helps to ensure that a reset occurs only when the object is not near other objects, and that the reset procedure does not switch the identities of objects.

This reset heuristic may be used to desirably adjust the scale parameters of the parametric maximization algorithm. Since the use of an expectation maximization (EM) algorithm decouples interdependence of the motion parameters of various objects (especially near occlusions), each of the motion parameters can be estimated independently. In the light of these simplifications, it may be desirable to use a search-based method to find the best motion parameters.

In step 104, with the layer ownership probabilities initialized for pixels of the selected frame, a parametric motion model is estimated by matching both the appearance and shape models from the preceding frame (time t−1) with the new observations and initialized layer ownership probabilities.

The exemplary EM algorithm may be used as part of an inner loop to solve for the motion parameters as described by J. A. Bilmes in A *Gentle Tutorial of the EM Algorithm and its Applications to Parameter Estimation for Gaussian Mixture and Hidden Markov Models*, Tech. Report TR-97-021 and by A. P. Dempster, N. M. Laird, and D. B. Rubin in *Maximum Likelihood from Incomplete Data via the EM Algorithm* (J. Royal Statistical Society B, Number 39, pp. 1-38, 1977). In these exemplary approaches, the EM algorithm may be used to solve for the current motion parameters, $\Theta_t$, given that $\Lambda_{t-1}$ (i.e. appearance, shape and motion parameters for time t−1) are known. The goal is to estimate the motion parameters $\Theta_t$ that maximize the log likelihood of the current motion parameters, $\Theta_t$, given the appearance, shape and motion parameters for time t−1, $\Lambda_{t-1}$. According to the EM algorithm, maximizing this log likelihood is equivalent to iteratively maximizing the sum over all the layers of the log posterior probability of the current motion parameters, $\Theta_t$, given past observation, layer assignments, mixture and motion parameters times the expected ownership probability given the data observations, and a set of appearance, shape and motion parameters.

Using Bayes' rule and a uniform prior, this maximization problem can be written in terms of the layer mixture model having three elements, each of which represents a contribution to the objective function from each of the appearance components per layer. The first element includes contributions due to the object appearance model component summed over all object layers, the second element includes contribution due to the background layer, and the third element includes the contribution due to the outlier layer. Each of these elements has two terms; the first term being the matching cost between the mixing probabilities from time (t−1) warped to the current frame and the expected ownership probabilities and the second term being the matching cost between the appearance likelihood term and the expected ownership probabilities.

An online version of this exemplary EM algorithm may be used to recursively estimate the set of current parameters, $\Lambda_t^\alpha = \{M_t, \Psi_t\}$, given the set of parameters, $\Lambda_{t-1}$, from time (t−1). Once an initial estimation of the set of all parameters, $\{\Lambda_k\}_{k=0}^t$ has been completed in step 104, the estimates of layer ownership probabilities and the set of motion parameters are tested to determine if they are adequate, step 106. This determination may be based on the log likelihood function achieving a predetermined minimum likelihood value. Alternatively, it may be based on the difference between the most recently calculated log likelihood and the log likelihood value calculated in the previous iteration being below a predetermined maximum change value, in which case the log likelihood function before the first iteration may desirably be set to zero. It is contemplated that this determination may be based on a combination of the present iteration log likelihood value and the difference value. It is also contemplated that the estimation procedure of the present invention may be designed to perform a set number of iterations to refine the layer owner probability and motion parameter estimates.

If it is determined that the estimates of layer ownership probabilities and the set of motion parameters are adequate, then these layer ownership probabilities and motion parameters are used to update the object position and appearance model in step 108. Otherwise, a recursive procedure, such as the exemplary EM algorithm, is used to continue refining the estimates of the set of current frame parameters.

Since an initial set of estimated parameters have been calculated already, the layer ownership probabilities for the plurality of layers in the selected frame may be desirably refined using the EM algorithm, step 110. This refining step may be based on: the appearances of the plurality of layers for the preceding frame of the sequence of frames; the mixing probabilities and the observed pixel data from the pixels of the preceding frame; and the estimated set of motion parameters of the plurality of layers for the selected frame. The estimated set of motion parameters of the plurality of layers for the selected frame may then be refined as well using the EM algorithm, step 112, based on: the appearances of the plurality of layers for the preceding frame of the sequence of frames; the mixing probabilities and the observed pixel data from the pixels of the preceding frame; the observed pixel data and the updated layer ownership probabilities for the pixels of the selected frame; and the estimated set of motion parameters of the plurality of layers for the selected frame.

These refined estimates may then be used to again determine if the estimated layer ownership probabilities and set of motion parameters are adequate, step 106. This recursive process may be continued until adequate results are achieved for tracking of the object(s) in the frame of video data, or a predetermined number of iterations of the EM algorithm have been performed. It has been observed during experimental use of this exemplary method that at most two iterations of the EM algorithm are usually adequate to achieve a reasonable motion estimate. It is also noted that the search window used during step 102 may be chosen to be of a fixed size, and centered at the position predicted by an adaptive constant velocity model to increase the efficiency of the non-parametric motion model without substantially affecting the overall track capability of the system.

In summary, by decoupling the problems of estimating initial layer ownership probabilities from estimating layer motion, the exemplary method of FIG. 1 achieves improved tracking over existing layer-based tracking systems. The initial layer ownership probabilities are estimated using a non-parametric motion model, such as optical flow, and hence can predict accurate initial layer ownership probabilities even under complex motions, whereas layer motion estimation involves simple parametric models of motion to allow for stable, drift-free estimates.

Figure 8:
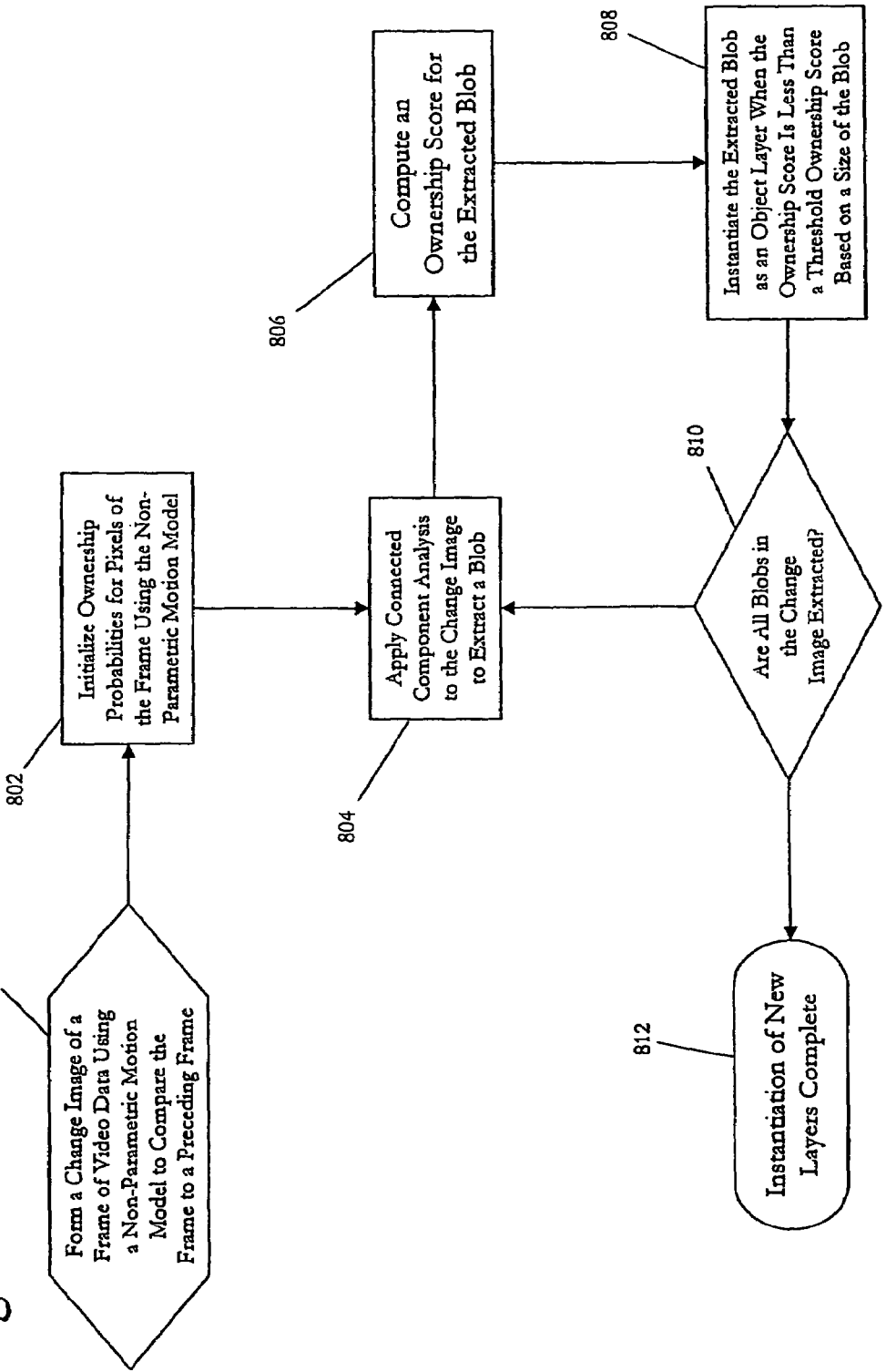
FIG. 8 is a flow chart illustrating an exemplary method of instantiating new layers in a frame of video data according to the present invention.

Another aspect of the performance of a real-world automatic system for tracking object within frames of video data is the instantiation of object layers. The present invention provides an improved method for instantiation of object layers. FIG. 8 illustrates an exemplary method for instantiating one or more object layers in a frame of video data that includes a plurality of pre-existing layers, which include at least a background layer and an outlier layer.

Figure 3:
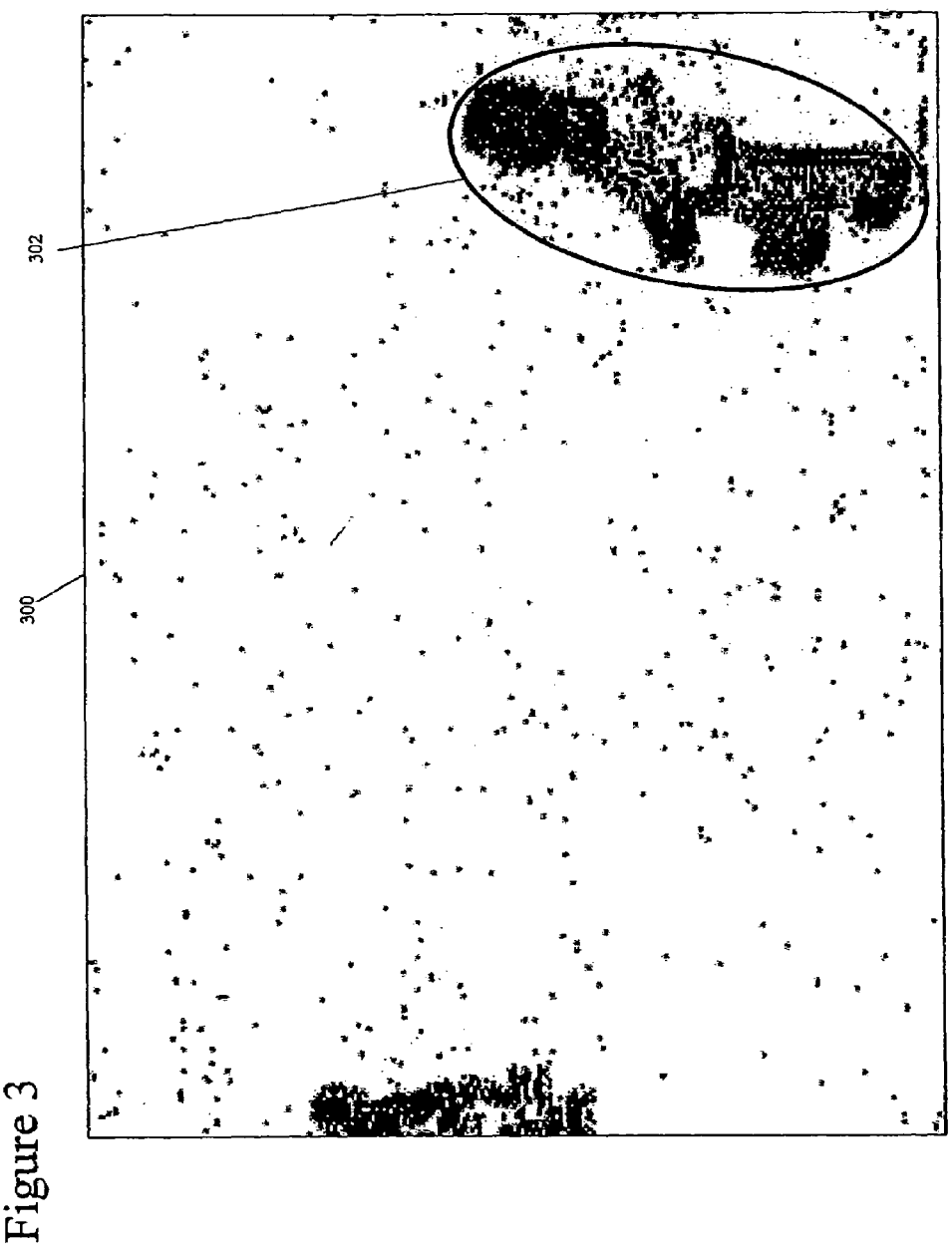
FIG. 3 is an exemplary change image that may be used in the exemplary method of FIG. 1.
Figure 9:
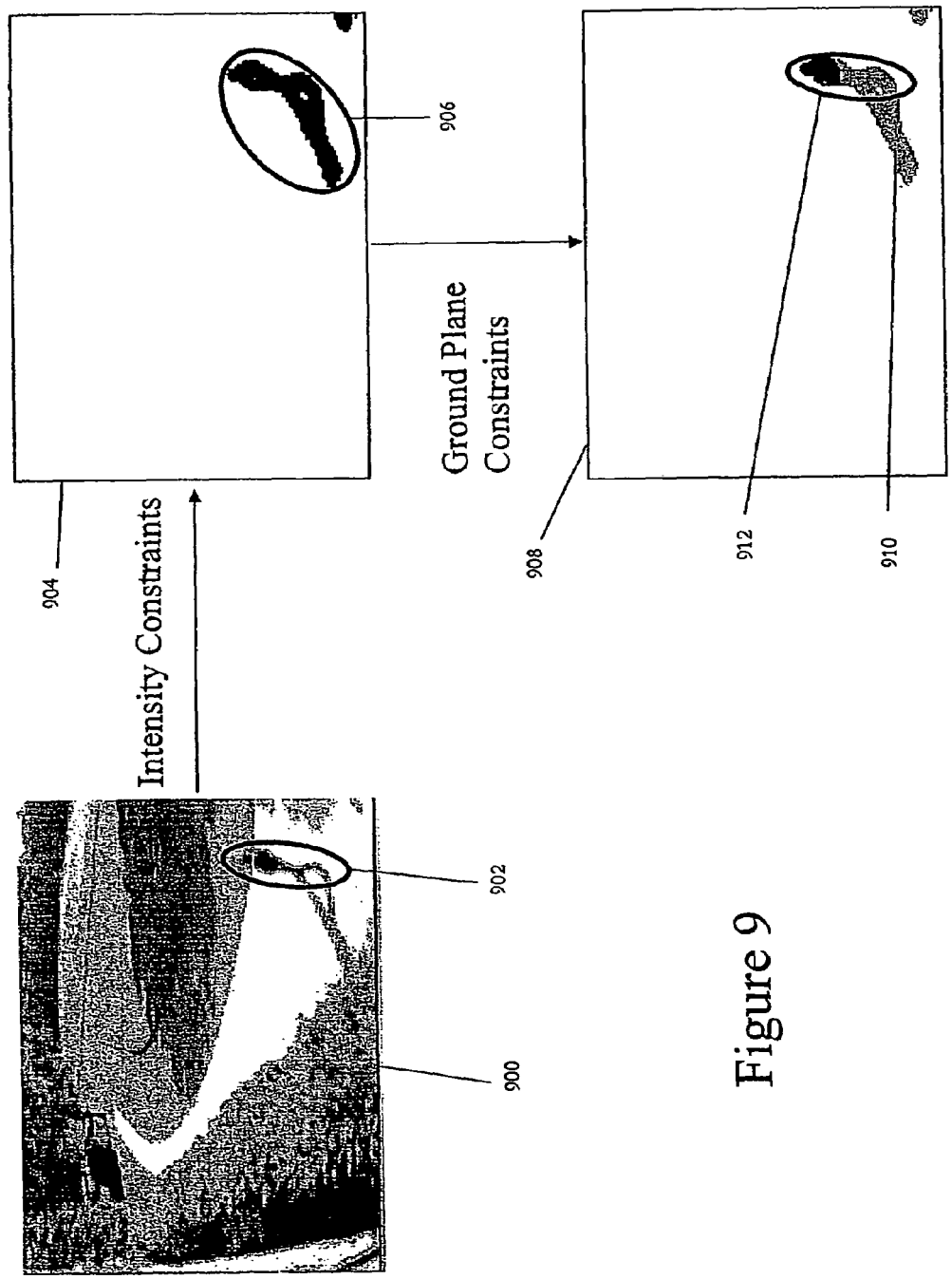
FIG. 9 is a block diagram illustrating an exemplary method of using ground plane geometry constraints to remove shadows according to the present invention.

Object instantiation may be desirably performed using the background probability distribution, $P_b(d_t)$, and the outlier distribution, $p_o(d_t)$. A change image of the frame of video data is formed, using a non-parametric motion model to compare the frame of video data to a preceding frame of video data, step 800. Non-parametric motion models that may be used include optical flow and intensity constraints. FIG. 3 illustrates exemplary change image 300 formed using optical flow. FIG. 9 illustrates change image 904 formed from image 900 using a non-parametric intensity constraint.

Three exemplary non-model-specific approaches to forming a change image have been considered. In the first exemplary approach, change is detected by competing between these probability distributions. Because the outlier model has a uniform density, this approach reduces to a fixed threshold on the background distribution. In the second exemplary approach, change is detected based on an adaptive threshold on the probability distribution. The threshold may be chosen individually for each pixel such that probability of false detect is a given constant. This approach may have an advantage over the first exemplary approach when the underlying distribution is peaky. Then the threshold may be chosen to be higher, and in less peaky distributions the threshold may be chosen to be lower. In other words, if a pixel area corresponds to a waving tree, choosing a lower threshold may avoid detecting change. In the third exemplary approach, change is detected by competing between the ownership probabilities for the background and the outlier layer. This approach may provide additional robustness to random image perturbations, because for the ownership probability of the outlier layer to become high the mixing probability are also be high. Thus, only temporally persistent change is detected using this approach.

As a histogram based non-parametric model of the background is capable of modeling a variety of changes, such as blinking lights, periodically waving trees, bushes, etc., the first exemplary approach, which is the simplest among the three, may be adequate, but, as noted above, the other two exemplary approaches have certain advantages.

The non-parametric motion model also initializes the ownership probabilities for pixels of the frame by pre-existing layers that have already been instantiated, step 802. If optical flow is used as the non-parametric motion model, this initialization may desirably include warping mixing probabilities, appearances of the plurality of pre-existing layers, and observed pixel data from pixels of the preceding frame to the pixels of the frame to initialize the ownership probabilities for the pixels of the frame by the plurality of pre-existing layers.

Connected component analysis is then applied on the change image to extract one or more blobs that exhibit change, step 804. The non-parametric motion model used in this exemplary method may include a number features that may help to reduce difficulties associated with blob extraction, and other portions of the instantiation process. For example, the non-parametric motion model may include matching of histograms. These histograms may be two dimensional histograms of appearances of the pre-existing layers of the preceding frame and observed pixel data of blobs in the present frame. These two dimensional histograms may include bins populated according to the observed pixel data. Alternatively, the matched histograms may be the three dimensional histograms of appearances of the pre-existing layers of the preceding frame and observed pixel data of blobs in the present frame. These three dimensional histograms may include bins populated according to the observed pixel data and a distance of a pixel from an origin point, or bins populated according to observed pixel data and a distance of a pixel from an edge.

The non-parametric motion model may also include a geometry-based constraint on the ownership probabilities, such as a ground plane geometry constraint or a shape model. Exemplary shape models may include a human shape model or a human head and shoulder model. Another exemplary geometry-based constraint is a shape model that includes scaling and orientation parameters determined by a ground plane geometry constraint. The non-parametric motion model may also include a three dimensional depth constraint on the ownership probabilities of the layers.

Oval 302 in FIG. 3 illustrates a portion of change image 300 that may be extracted by connected component analysis to form a blob. Likewise, in FIG. 9, oval 906 illustrates a portion of change image 902 that may be extracted as a blob in this step. Note that the blob extracted simply using connected component analysis in FIG. 9 includes not only a representation of person 902, but also includes their shadow. This may often be undesirable.

FIG. 9 illustrates an exemplary method to remove an associated shadow from a blob extract in step 804 using ground plane constraints. First, connected change blob 904 of change image 902 is identified as including change and extracted by connected component analysis. The ground plane constraints are applied to connected change blob 904 to identify any region of it that appears to lie along the ground plane. Such regions are identified as shadows. Constrained change image 908 illustrates the removal of shadow portion 910 from the extracted blob, leaving only blob 912, which corresponds to person 902 in frame 900.

FIGS. 10A and 10B illustrate another exemplary method to remove an associated shadow from a blob extract in step 804. This exemplary method uses a three dimensional depth constraint to remove a shadow portion from the extracted blob. As illustrated in FIG. 10A, subtracting current image 1002 from background image 1000 provides a simple means of obtaining change image 1004. Unfortunately, applying connected component analysis in step 804 to this change image may lead to a large initial blob that includes several people moving through the room and their shadows. FIG. 10B illustrates the exemplary extraction of blobs 1014, 1016, and 1018 using three dimensional depth constraints. In this exemplary method, current frame depth image 1010 is subtracted from background depth image 1008 to produce change image 1012, which includes depth information. As the shadows have no depth, unlike change image 1004, they do not appear in change image 1012.

The depth information in change image 1012 also allows for a simple heuristic to separate regions representing different objects in the frame which have partially occluded one another. It may also prove useful for instantiating new layers for objects that enter the sequence of frames partially occluded.

When analyzing the set of blobs extracted using connected component analysis in step 804 to determine if the blob represents a new object for which a new layer is to be instantiated, an initial blob is selected. A score is computed for every blob extracted in step 804 that measures how much of the blob is already pre-owned by existing layers, step 806. This measure may be computed by summing the layer ownership probabilities over the pixels included in the blob. A threshold based on the ratio of sum of layer ownership probabilities and blob size may used to determine if a new blob should be instantiated. Other heuristics such as minimum blob size and minimum average motion of the pixels in the blob from one frame to the next may be used in conjunction with this threshold to determine whether to instantiate a new layer.

In some cases the initially selected blob may be determined to include portions representing more that one object, such as blob 1006 in FIG. 10A. A portion of the initial blob that represents an object may be desirably identified and separately extracted from the remainder of the initial blob. This remainder may then be returned to the set of blobs not yet analyzed.

Exemplary means for identifying portions of the selected initial blob representing separate objects may include shape models of exemplary objects to be tracked, ground plane geometry constraint, adaptable shape models that include scaling and orientation parameters determined by the ground plane geometry constraint, and/or three dimensional depth constraints. If the objects desired to be tracked are humans, a human shape model, or a human head and shoulder model may be employed. It is noted that such exemplary identification and separation of blob portions may also desirably allow for the removal of unwanted shadow portions from the selected initial blob. When using this exemplary method to remove shadow portion from the selected initial blob. The selected initial blob may be separated into a plurality of sub-blobs and each one of the sub-blobs selected one at a time to identify the portion representing the object and returning the remaining sub-blobs to set of initial blobs as new initial blobs.

The blob extracted in step 804 is instantiated as a new object layer when the ownership score computed in step 806 meets predetermined criteria, such as being less than a threshold ownership score based on a size of the blob, step 808. For example, if the size of the extracted blob is measured in pixels and the threshold ownership score is greater than or equal to a predetermined constant times the size of the extracted blob, then the blob is selected for instantiation.

The instantiation of the blob may desirably include the instantiation of the object layer representing the newly identified object. During this instantiation, the new object layer is initialized. At initialization, a bounding box for the layer is determined from the bounding box of the associated blob so as to include the subset of pixels in the blob. Within that bounding box, the appearance model is initialized, and the mixing probabilities for each are set to a fixed value. The bounding box puts a bound on the extent of the object, and the layer ownerships, mixing probabilities, and the appearance model is updated only within that bounding box. The layer ownership probabilities for the subset of pixels in the blob are updated to equal a first predetermined probability of their ownership by the new static object layer, a second predetermined probability of their ownership by the new object layer. The probability of ownership of this subset of pixels by the plurality of pre-existing layers is set to zero at the same time. The mixing probabilities for the object layer is initialized to equal a third and fourth predetermined probability, respectively, for the subset of pixels and zero probability for other pixels of the frame. The appearance of the object is initialized to equal pixel values of the subset of pixels.

By constraining the influence of a newly instantiated layer to within the bounding box, significant computational advantage is achieved without compromising tracking performance An object layer is destroyed if the sum of ownership probabilities falls below a fixed threshold related to the minimum blob size.

The change image is then checked to determine if all of the blobs identified therein have been extracted, step 810. If all of the blobs have been extracted, then the instantiation of new layer is complete, step 812, and the tracking system may proceed to estimate motion parameters and update layer ownership probabilities for the current frame. Otherwise, additional blobs are extracted and analyzed in steps 804, 806, and 808 until all of the blobs have been extracted.

It is noted that translational motion models alone cannot account for scale changes or affine distortions. To account for these changes, a simple layer bounding box reset heuristic may be quite effective in practice. Periodically, for every object layer, the amount of each change blob owned by the object layer is measured. If 1) the object layer owns a significant portion of a blob; 2) the sum of layer ownerships is close to blob size; and 3) there is only one such blob, the bounding box, the appearance model and initial mixing probabilities are reset for the object layer(s). A new bounding box is initialized that covers the whole change blob. These conditions ensure that such a reset occurs only when the object represented by the object layer(s) is not near other objects, and the reset procedure does not switch the identities of objects represented by object layers.

Figure 11:
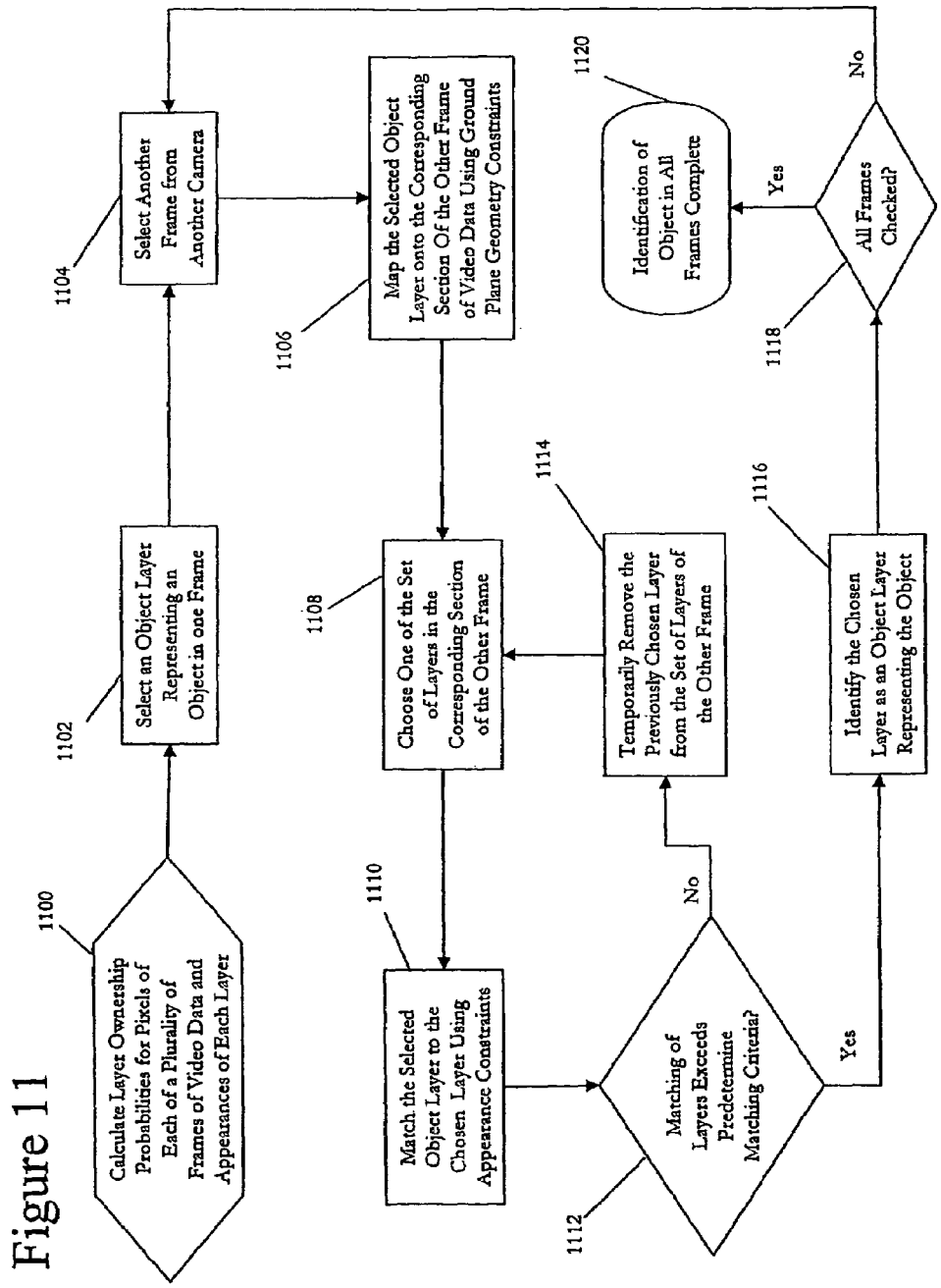
FIG. 11 is a flow chart illustrating an exemplary method of identifying tracked objects across multiple video frames from multiple cameras according to the present invention.
Figure 12:
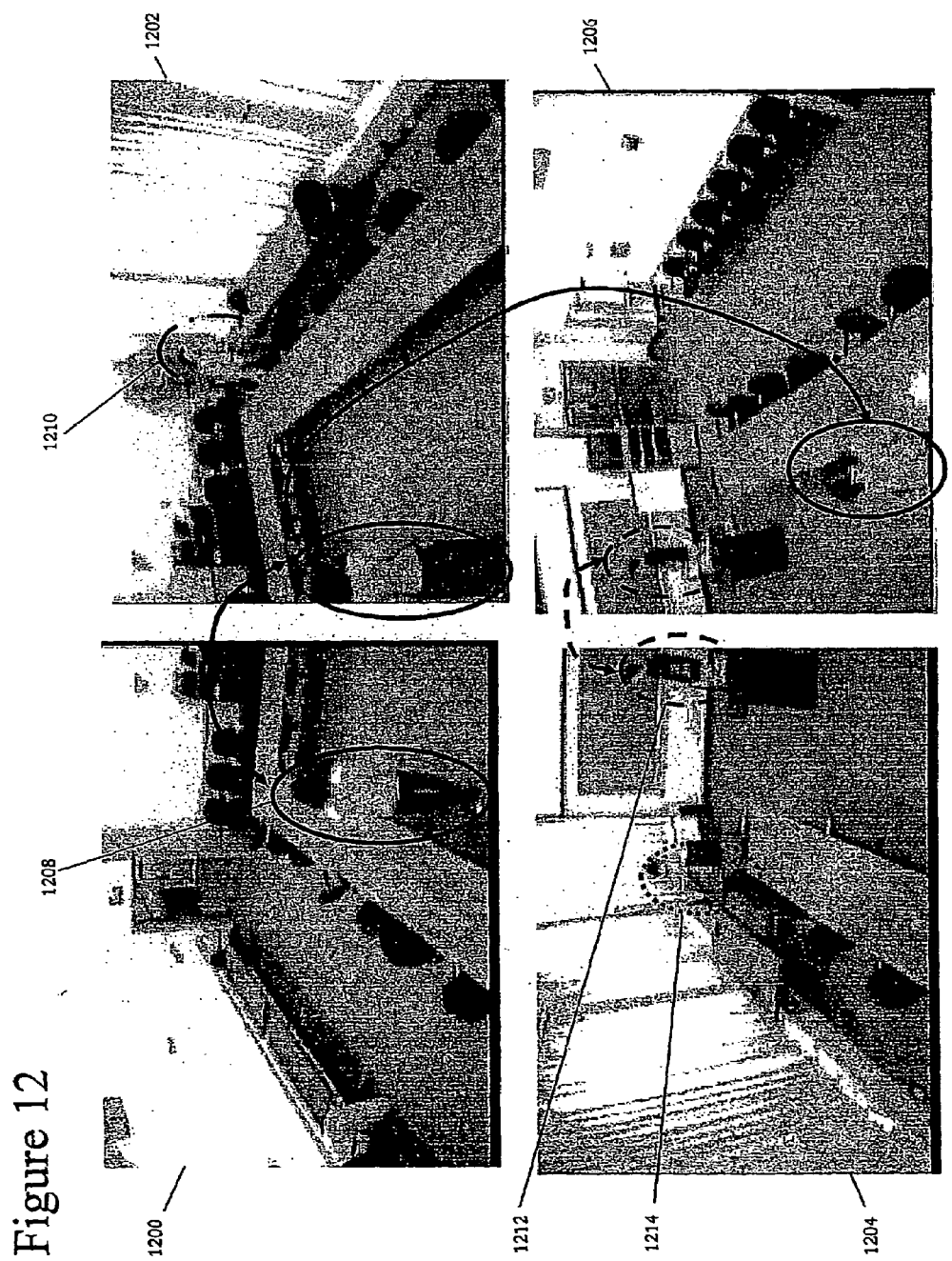
FIG. 12 is a series of video frames from multiple cameras illustrating a number of people appearing in various frames.

FIG. 11 illustrates an exemplary method of identifying an object in a plurality of frames of video data recorded substantially simultaneously by a corresponding plurality of video cameras, each of which desirably has a different viewpoint than the other video cameras. Each of the substantially simultaneously recorded frames of video data is represented by a corresponding set of layers. At least one of these sets of layers includes one or more object layers that represent the object as it appears in the corresponding frame of video data. FIG. 12 illustrates such an arrangement. Frames 1200, 1202, 1204, and 1206 were recorded at substantially the same time using four separate video cameras located at different points in the room. Person 1208 can be seen in three of the frames, frames 1200, 1202, and 1206. Person 1212 can be seen in two of the frames, frames 1204 and 1206, while persons 1210 and 1214 can only be seen in one frame each.

For each of the substantially simultaneously recorded frames of video data, layer ownership probabilities of the set of layers corresponding to a frame are calculated for the pixels of the frame. An appearance of each of these layers is calculated as well, step 1100. The layer ownership probabilities and the appearances of the layers may desirably be calculated using the exemplary method of FIG. 1.

One of the object layers representing the object in one frame of video data is selected, step 1102. Another of the substantially simultaneously recorded frames is then selected, step 1104. The selected object layer of the first frame is mapped onto a corresponding section of frame of video data selected in step 1104 using ground plane geometry constraints, step 1106. If this mapping is not possible, then the object is not represented in the selected frame and another frame of video data is selected.

One of the layers of the set of layers corresponding to the frame selected in step 1104 is chosen, step 1108. This chosen layer is desirably substantially located in the corresponding section of the frame. If one of the object layers of the frame selected in step 1104 was previously identified as representing the object, and that object layer is substantially located in the corresponding section of the other frame it is chosen. Otherwise, the layer that has a highest average ownership probability for pixels in the corresponding section of the frame selected in step 1104 is chosen.

The object layer selected in step 1102 is then matched to the layer chosen in step 1108 using appearance constraints, step 1110. Any suitable matching algorithm may be used to match the appearances of these layers, including direct pixel-to-pixel appearance matching and histogram matching.

For histogram matching, histograms of both the object layer selected in step 1102 and the layer chosen in step 1108 are generated. The histograms used for matching may be either two dimensional or three dimensional histograms as described above with regard to the exemplary method of FIG. 1. It is noted that the histograms may desirably be scaled based on the number of pixels in the layers. This may be particularly desirable when using three dimensional histograms. FIGS. 13A and 13B illustrate the use of exemplary histogram matching. FIG. 13A includes two substantially simultaneously recorded frames 1300 and 1302, which respectively include front image 1304 and rear image 1306 of a single person walking through the room. Three dimensional histograms 1308, corresponding to front image 1304, and 1310, corresponding to rear image 1306 are shown in FIG. 13B. The exemplary histograms in FIG. 13B show a significant match between the two layer appearances, even though direct pixel-to-pixel matching of the layers would show only a partial match.

Other exemplary algorithm may also be used to improve the matching of the selected layer and the chosen layer in step 1110. For example, a shape model for the object may be used to refine bounding box estimates of the object layer selected in step 1102 and the layer chosen in step 1108. The refined layers may then be matched.

Once the matching of the layers in step 1110 is completed, the degree of match between the layers is compared to predetermined matching criteria, step 1112. If the matching of the layers does not exceed these predetermined matching criteria, the layer chosen in step 1108 is temporarily removed from the set of layers corresponding to the frame selected in step 1104, step 1114. Other layers of the set of layers corresponding to the frame selected in step 1104 are chosen and the matching repeated, steps 1108 and 1110, until a suitable match is obtained or all of the layers have been chosen.

If the matching of the layers in step 1110 does exceed the predetermined matching criteria, the layer chosen in step 1108 is identified as an object layer representing the object, step 1116. It is then determined whether all of the substantially simultaneously recorded frames have been checked for object layers representing the object, step 1118. If all of the frames have been checked then the identification of the object across the frames of all of the cameras is complete, step 1120. If some frames remain in which an attempt to identify object layers representing the object has not yet been made, another frame is selected, step 1104 and the process continues.

It is contemplated that the exemplary method of FIG. 11 may be expanded to identify all object layers of all of the frames by performing these exemplary steps on each new unidentified object layer in the first frame and then on any remaining unidentified object layers in the other frames until all of the object layers have been identified. This exemplary method may also prove useful for instantiation of new layers by anticipating the appearance of existing layers other frames. It may also prove useful for the tracking of objects through partial, and even full, occlusions in frame recorded by some or all of the cameras.

A selective use of non-parametric motion in terms of optical flow for prediction of object ownership probabilities, and parametric motion for object motion estimation allows an exemplary flexible layer-based tracking system of the present invention to handle tracking of complex objects under a variety of non-rigid motions and inter-object occlusions.

The present invention includes a number of exemplary methods to track both rigid and non-rigid objects in a variety of environments. The use of these exemplary methods allows greatly simplified, yet highly accurate, tracking of these objects. Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A computer implemented method for tracking an object recorded within a selected frame of a sequence of frames of video data from at least one video camera, using a plurality of layers, at least one object layer of the plurality of layers representing the object, the method comprising the steps of:
   a) assigning layer ownerships and layer ownership probabilities pixels in a layer of the selected frame using a non-parametric motion model;

b) re-assigning layer ownership and layer ownership probabilities for the pixels in the layer by jointly estimating motion, shape and appearance of the layer using a parametric maximization algorithm, the parametric maximization algorithm being based on a parametric motion model, a shape model, and an appearance model, the appearance model being based on at least one of 2D histograms and 3D histograms, the 2D histograms being 2D color histograms of pixels weighted over time and over the spatial extent of the layer as defined by the layer ownerships, the 3D histograms having bins that are populated according to pixel data and a geometric constraint, the geometric constraint being at least one of the distance of a pixel from an edge of a blob within a template and the distance of a pixel from an origin point; and c) tracking the object.

2. The method of claim 1, further comprising the step of (d) estimating a set of motion parameters of the plurality of layers for the selected frame using the parametric maximization algorithm, wherein estimating the set of motion parameters is based upon:

appearances of the plurality of layers for a proceeding frame of the sequence of frames;

mixing probabilities and observed pixel data from pixels of the preceding frame;

observed pixel data and the layer ownership probabilities for the pixels of the selected frame; and an initial estimated set of motion parameters of the plurality of layers for the selected frame.

3. The method of claim 2, wherein tracking the object is based upon:

the layer ownership probabilities for the pixels of the selected frame; and the set of motion parameters of the plurality of layers estimated in step (d).

4. The method of claim 2, wherein step (d) further includes the steps of:

b1) refining layer ownership probabilities for the plurality of layers in the selected frame using the expectation maximization algorithm based on;

the appearances of the plurality of layers for the preceding frame of the sequence of frames;

the mixing probabilities and the observed pixel data from the pixels of the preceding frame; and the estimated set of motion parameters of the plurality of layers for the selected frame; and b2) refining the estimated set of motion parameters of the plurality of layers for the selected frame using the estimation maximization algorithm based on;

the appearances of the plurality of layers for the preceding frame of the sequence of frames;

the mixing probabilities and the observed pixel data from the pixels of the preceding frame;

the observed pixel data and the updated layer ownership probabilities for the pixels of the selected frame; and the estimated set of motion parameters of the plurality of layers for the selected frame.

5. The method of claim 4, wherein step (d) further includes the step of: b3) repeating steps (b1) and (b2) at least once.

6. The method of claim 2, wherein the non-parametric motion model used in step (a) is optical flow; and step (a) includes warping the mixing probabilities, the appearances of the plurality of layers, and the observed pixel data from the pixels of the preceding frame to the pixels of the selected frame to initialize the layer ownership probabilities for the pixels of the selected frame.

7. The method according to claim 1, wherein the non-parametric motion model used in step (a) includes matching of two dimensional or three dimensional histograms of the appearances of the plurality of layers of the preceding frame and the observed pixel data of blobs of pixels of the selected frame.

* * * * *